UNITED STATES PATENT OFFICE.

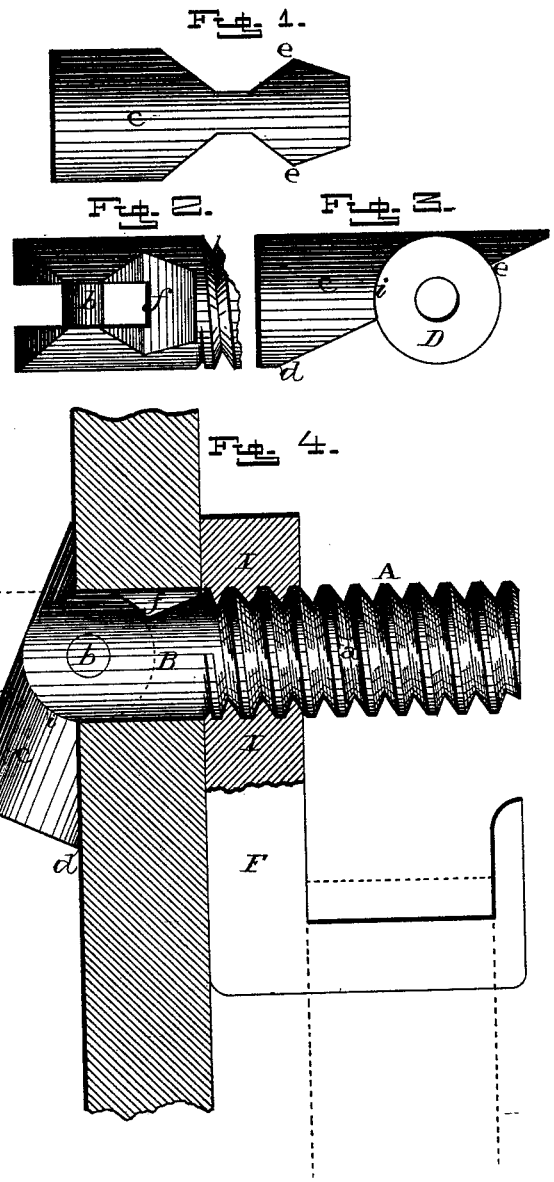

RUFUS R. COOLEY AND ALBA W. A. WINSOR, OF WILLIMANTIC, CONNECTICUT; SAID WINSOR ASSIGNOR TO SAID COOLEY.

IMPROVEMENT IN SCAFFOLD-BRACKET FASTENINGS.

Specification forming part of Letters Patent No. 202,998, dated April 30, 1878; application filed March 11, 1878.

*To all whom it may concern:*

Be it known that we, RUFUS R. COOLEY and ALBA W. A. WINSOR, of Willimantic, in the county of Windham and State of Connecticut, have invented certain new and useful Improvements in Bracket-Fastenings; and we do hereby declare the following to be a full, clear, and exact description of the invention, such as will enable others skilled in the art to which it pertains to make and use it, reference being had to the accompanying drawings, which form part of this specification.

This invention relates principally to bracket-fastenings for supporting scaffolding; and consists in the construction of a self-heading bolt and a hook forming the nut on said bolt, as well as the support for the brace, as will be hereinafter more fully set forth.

The annexed drawing, to which reference is made, fully illustrates our invention.

A represents the bolt, having screw-threads $a$ from one end inward for a suitable distance, and the remaining portion, B, of the bolt being cylindrical, of the same diameter as the outer edges of the threads $a$. The part B of the bolt is forked, and the extreme end rounded, as shown, and through the two prongs of the fork is passed a pin or rivet, $b$, which is permanently fastened therein, and its ends made flush and smooth with the outside surface of the bolt. This pin or rivet pivots the drop-head C to the bolt. This head is cylindrical at its outer end, and of the same diameter as the bolt. Its under side is beveled from a point, $d$, near the outer end to the inner end, where are formed two side wings, $e\ e$, which fit in a corresponding notch or recess, $f$, in the top of the part B of the bolt. At or near the center of the beveled portion of the head C is formed a circular part, D, with a central orifice for the passage of the pin or rivet $b$, and back of this circular part D are curved shoulders $i\ i$, fitting against the rounded end of the bolt.

It will readily be seen that when the bolt is held in a horizontal position, with the bevel of the head C upward, said head will remain on a line with the bolt; but as soon as the bolt is turned one-half around, the head will, by its own gravity, turn downward, making the bolt self-heading.

For supporting scaffolding, a hole is bored in the siding, and, if necessary, through the studding also, and the bolt inserted head foremost, until, by turning over the bolt, the head C will drop down, when the bolt is drawn outward until the beveled side of the head, both above and below the bolt, forms a stop for the same.

F represents a square flat hook, having its inner arm enlarged at I, and formed with an orifice having female threads of a size to fit the bolt A. This hook is screwed tightly up on the bolt against the wall, no other nut or fastening device being necessary. The bracket, of any suitable construction, is then hung on said hook F, and the scaffolding attached to the brackets in any suitable manner.

Our invention may be applied for other purposes, as well as for scaffolding.

We are fully aware that a self-heading bolt is of itself not new; and we do not claim such, broadly, as our invention.

The peculiar construction of our bolt renders it perfectly safe, and, when put in place, forms a firm and durable support, which cannot come loose until the bolt is pushed inward a certain distance and then turned half around, when the head will drop back to its place on a line with the bolt.

Having thus fully described our invention, what we claim as new, and desire to secure by Letters Patent, is—

1. The bolt A, having cylindrical forked part B, with recess $f$ and pin or rivet $b$, in combination with the beveled head C, having circular part D, wings $e\ e$, and curved shoulders $i\ i$, substantially as and for the purposes herein set forth.

2. In combination with the bolt A B, having beveled pivoted head C D, the square flat hook F, having its arm I provided with an orifice with female threads to fit the bolt, substantially as and for the purposes herein set forth.

In testimony that we claim the foregoing we have hereunto set our hands this 4th day of March, 1878.

RUFUS R. COOLEY.
ALBA W. A. WINSOR.

Witnesses:
J. THEO. TRACY,
HUBER CLARK.